United States Patent
Inomata

(10) Patent No.: US 7,283,299 B2
(45) Date of Patent: Oct. 16, 2007

(54) MAGNIFYING OBSERVATION APPARATUS, METHOD FOR OBSERVING MAGNIFIED IMAGE, AND COMPUTER-READABLE MEDIUM

(75) Inventor: Masahiro Inomata, Osaka (JP)

(73) Assignee: Keyence Corporation, Osaka (JP)

( * ) Notice: Subject to any disclaimer, the term of this patent is extended or adjusted under 35 U.S.C. 154(b) by 89 days.

(21) Appl. No.: 10/694,659

(22) Filed: Oct. 28, 2003

(65) Prior Publication Data

US 2004/0085652 A1   May 6, 2004

(30) Foreign Application Priority Data

Oct. 29, 2002   (JP)   ............ P.2002-314904

(51) Int. Cl.
G02B 21/06   (2006.01)

(52) U.S. Cl. .............. 359/390; 359/385; 359/384

(58) Field of Classification Search ......... 359/368–398
See application file for complete search history.

(56) References Cited

U.S. PATENT DOCUMENTS

| | | | |
|---|---|---|---|
| 6,396,941 B1 | 5/2002 | Bacus et al. ................ | 382/128 |
| 6,541,771 B2 * | 4/2003 | Iwabuchi et al. ............ | 250/310 |
| 6,882,350 B2 * | 4/2005 | Asami ........................ | 345/638 |
| 2002/0118359 A1 * | 8/2002 | Fairley et al. ............. | 356/237.2 |
| 2003/0193025 A1 * | 10/2003 | Takagi ....................... | 250/310 |

FOREIGN PATENT DOCUMENTS

| | | |
|---|---|---|
| JP | 05-100169 | 4/1993 |
| JP | 05-174767 | 7/1993 |
| JP | 05-256786 | 10/1993 |
| JP | 06-164997 | 6/1994 |
| JP | 11-164293 | 6/1999 |
| JP | 11326779 | 11/1999 |
| JP | 2000-099688 | 4/2000 |
| JP | 2000-214790 | 8/2000 |
| JP | 2002-156962 | 5/2002 |
| JP | 2002202463 | 7/2002 |

OTHER PUBLICATIONS

Afework, A., et al, "Digital Dynamic Telepathology—the Virtual Microscope," Proceedings of the Amia Annual Symposium (1998), pp. 912-916.
European Search Report from EP Application No. 03024974.2 dated Feb. 4, 2004.

* cited by examiner

Primary Examiner—Joshua L Pritchett
(74) Attorney, Agent, or Firm—Kilyk & Bowersox, P.L.L.C.

(57) ABSTRACT

In a magnifying observation apparatus, simple observation conditions are set for simply acquiring a plurality of observation images. A plurality of simple observation images are acquired per the plurality of simple observation conditions set, and displayed on a simple observation image display section. A desired simple observation image is selected from among the plurality of simple observation images displayed on the simple observation image display section. The observation conditions are further set as required based on the simple observation conditions set to the simple observation image selected. An observation image acquired based on the observation conditions set is displayed.

25 Claims, 11 Drawing Sheets

MAGNIFYING OBSERVATION APPARATUS, METHOD FOR OBSERVING MAGNIFIED IMAGE, AND COMPUTER-READABLE MEDIUM

BACKGROUND OF THE INVENTION

1. Field of the Invention

The present invention relates to a magnifying observation apparatus for photographing and displaying a magnified image such as a microscope, a method for observing a magnified image, and a computer-readable medium storing instructions for operating the magnifying observation apparatus.

2. Description of the Related Art

Today, optical microscopes using optical lens or digital microscopes are in use as magnifying observation apparatus which display magnified micro-objects. A micro scope is equipped with a light receiving element such as a CCD for electrically reading, per pixel arranged two-dimensionally, a reflected light or a transmitted light from an observation subject fixed to an observation subject fixing section incident via an optical system. The microscope displays on a display section such as a display an image electrically read using a CCD (for example see the Japanese Patent Laid-Open No. 2000-214790).

When observing a subject (work) such as an observation subject, it is necessary to adjust the observation conditions optimally in order to obtain a desired image. Setting items of observation conditions include the illumination method, brightness and angle. Typically, the user who operates a microscope manually replaces the illumination parts of the lens, controls the brightness of the illumination, or switches between illumination methods to check the effect of control while displaying the observation image on the monitor on a trial-and-error basis, thereby searching for observation conditions optimum for the work.

However, the method where the optimum observation conditions are searched for on a trial-and-error basis is highly cumbersome and time-consuming. Typically, only a single image can be displayed on the monitor. Thus, the required procedure is: 1) an observation image is displayed with certain observation conditions specified; 2) the observation image is evaluated; 3) the optimum observation conditions are specified; and 4) the observation image is displayed again. In this case, the observation image on the previous occasion is not stored so that the user must rely on his/her memory to predict more appropriate observation conditions based on comparison between the current observation image and the previous observation image. This procedure is repeated. The user predicts further optimum observation conditions based on his/her memory of the relationship between the parameters of the previous and second previous observation conditions and the images as well as states of changes. This makes the procedure extremely difficult. Moreover, the user needs expert knowledge on the performance of apparatus, photographing method, and meanings of parameters of the setting items in order to set the observation conditions. Thus, the above procedure is too difficult especially for a beginner. Accordingly, only the user having some degree of knowledge and experience can obtain the optimum observation results. Sufficient results cannot be obtained with insufficient observation conditions even when the performance of the microscope is excellent. Under present circumstances, the performance of the microscope used is not fully delivered in most cases.

SUMMARY OF THE INVENTION

The invention has been accomplished in view of the aforementioned circumstances. It is an object of the present invention to provide a magnifying observation apparatus which facilitates setting of observation conditions thereby improving the usability.

In order to attain the object, the invention provides, in its first aspect, a magnifying observation apparatus comprising: a simple observation condition setting section for setting simple observation conditions for simply acquiring a plurality of observation images; a simple observation image display section for displaying a plurality of simple observation images acquired per the plurality of simple observation conditions set with the simple observation condition setting section; a selection section for selecting a desired simple observation image from among the plurality of simple observation images displayed on the simple observation image display section; an observation condition setting section for setting further observation conditions as required based on the simple observation conditions set to the simple observation image selected with the selection section; and an observation image display section for displaying an observation image acquired based on the observation conditions set with the observation condition setting section.

The observation condition setting section maybe a setting section which can further adjust the conditions set with the simple observation condition setting section. The simple observation condition setting section and the observation condition setting section may be provided by way of a same user interface screen.

The invention provides, in its second aspect, a magnifying observation apparatus according to the first aspect, further comprising: a simple observation image acquisition section for acquiring simple observation images per the plurality of simple observation conditions set with the simple observation condition setting section; a simple observation image storage section for storing a plurality of simple observation images acquired with the simple observation image acquisition section; and an observation image acquisition section for acquiring an observation image based on the observation conditions set with the observation condition setting section, wherein the simple observation image display section displays the plurality of simple observation images stored into the simple observation image display section, and the observation image display section displays the observation image acquired with the observation image acquisition section.

The simple observation image acquisition section is means for simply acquiring an observation image and acquires an observation image for example by increasing the frame scan speed than typical image observation. A simple observation image may be acquired using the same method for acquiring a typical observation image.

The invention provides, in its third aspect, a magnifying observation apparatus according to the first aspect, wherein the simple observation image display section lists a plurality of simple observation images.

The invention provides, in its fourth aspect, a magnifying observation apparatus according to the first aspect, wherein the simple observation image display section comprises a switching section for selectively displaying the plurality of simple observation images.

The display section can selectively display observation image display section and the simple observation image display section. Switchover between theses two display screens can be made by way of a dedicated button on the magnifying observation apparatus or an operation program incorporated into the main unit.

The invention provides, in its fifth aspect, a magnifying observation apparatus according to the first aspect, further comprising: an adjustment section for performing at least positioning and focusing on an observation image displayed on the observation image display section before setting simple observation conditions by the simple observation condition setting section.

The invention provides, in its sixth aspect, a magnifying observation apparatus according to the first aspect, wherein the simple observation conditions set with the simple observation condition setting section includes at least one of the control of brightness of an image, adjustment of illumination method, adjustment of an angle of an imaging section, and image processing.

The invention provides, in its seventh aspect, a magnifying observation apparatus according to the sixth aspect, wherein the adjustment of the illumination method is made by way of at least one of selection between incident-light illumination and transmitting illumination as an illumination direction, selection between peripheral illumination and side illumination, and selection among a diffuser, a polarizer and a transmitted light without using filters as a filter for an illumination light.

Further, the invention provides, in its eighth aspect, a magnifying observation apparatus according to the sixth aspect, wherein the control of the brightness of an image is done by at least one of the control of the light quantity of the illumination, adjustment of the shutter speed of the imaging sections, gain control, and control of white balance.

Moreover, the invention provides, in its ninth aspect, a magnifying observation apparatus according to the first aspect, wherein at least the characteristics of an observation subject is set with the simple observation condition setting section.

The invention provides, in its tenth aspect, a method for operating a magnifying observation apparatus, the method comprising: photographing an observation image with arbitrary observation conditions and displaying an arbitrary observation image photographed; performing at least positioning and focusing on the arbitrary observation image displayed; varying the observation conditions on the adjusted observation image and setting simple observation conditions for simply acquiring a plurality of observation images; acquiring simple observation images per the plurality of simple observation conditions set; displaying the plurality of simple observation images acquired; selecting a desired simple observation image from among the plurality of simple observation images displayed; setting further observation conditions as required based on the simple observation conditions set to the simple observation image selected; acquiring an observation image based on the observation conditions set; and displaying the acquired observation image.

The invention provides, in its eleventh aspect, a computer-readable medium storing instructions for operating a magnifying observation apparatus, the instructions comprising: photographing an observation image with arbitrary observation conditions and displaying an arbitrary observation image photographed; performing at least positioning and focusing on the arbitrary observation image displayed; varying the observation conditions on the adjusted observation image and setting simple observation conditions for simply acquiring a plurality of observation images; acquiring simple observation images per the plurality of simple observation conditions set; displaying the plurality of simple observation images acquired; selecting a desired simple observation image from among the plurality of simple observation images displayed; setting further observation conditions as required based on the simple observation conditions set to the simple observation image selected; acquiring an observation image based on the observation conditions set; and displaying an observation image acquired.

The recoding media include magnetic disks, optical discs, magneto-optical disks, and other media such as semiconductor memories which can store programs, for example, CD-ROM, CD-R, CD-RW, or flexible disc, and magnetic tape, MO, DVD-ROM, DVD-RAM.

DETAILED DESCRIPTION OF THE INVENTION

Figure 1:
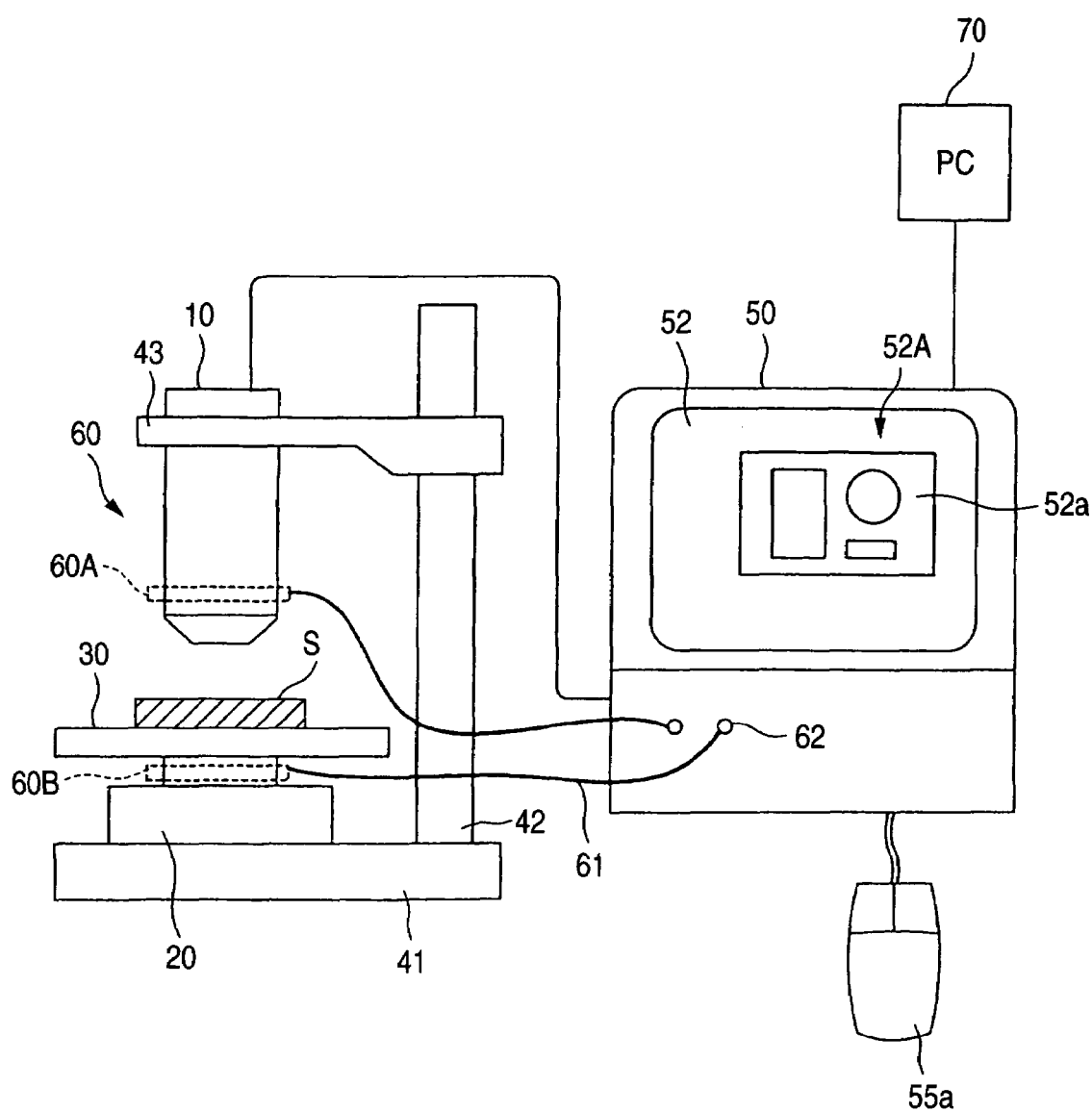
FIG. 1 is a general view showing the magnifying observation apparatus according to an embodiment of the invention.

Embodiments of the invention will be described referring to the drawings. The following embodiments illustrate magnifying observation apparatus, a method for operating the magnifying observation apparatus, and a computer-readable medium storing instructions for operating the magnifying observation apparatus, used to embody the technical thoughts of the invention. Note that the invention is not limited to the following magnifying observation apparatus, method for operating the magnifying observation apparatus, and computer-readable medium storing instructions for operating the magnifying observation apparatus.

The specification does not limit the members defined in the claims to those in the embodiments. The size of each member and relation between the members are exaggerated depending on the drawings for simplicity.

Connection between the magnifying observation apparatus used in the embodiment of the invention and a computer, printer, an external storage device and other peripherals for performing processing including operation, control, and display is made electrically, magnetically or optically to perform communications via, for example, serial connection such as IEEE1394, RS-232x and RS-422, and UBS, parallel connection, or a network such as 10BASE-T, 100BASE-TX, and 100BASE-T. The connection is not limited to a wired physical connection but may be a wireless LAN such as IEEE802.11x or wireless connection using radio waves, infrared rays or optical communications such as Bluetooth. A medium for exchanging data and saving the setting may be a memory card, a magnetic disk, an optical disc, a magneto-optical disk, and a semiconductor memory.

The magnifying observation apparatus according to the embodiment of the invention will be described using FIGS. 1 through 11. The magnifying observation apparatus comprises an illumination section 60 for illuminating an observation subject, an imaging section 10 for photographing the observation subject illuminated with the illumination section 60, and a display 52 for displaying a magnified image photographed with the imaging section 10.

Figure 2:
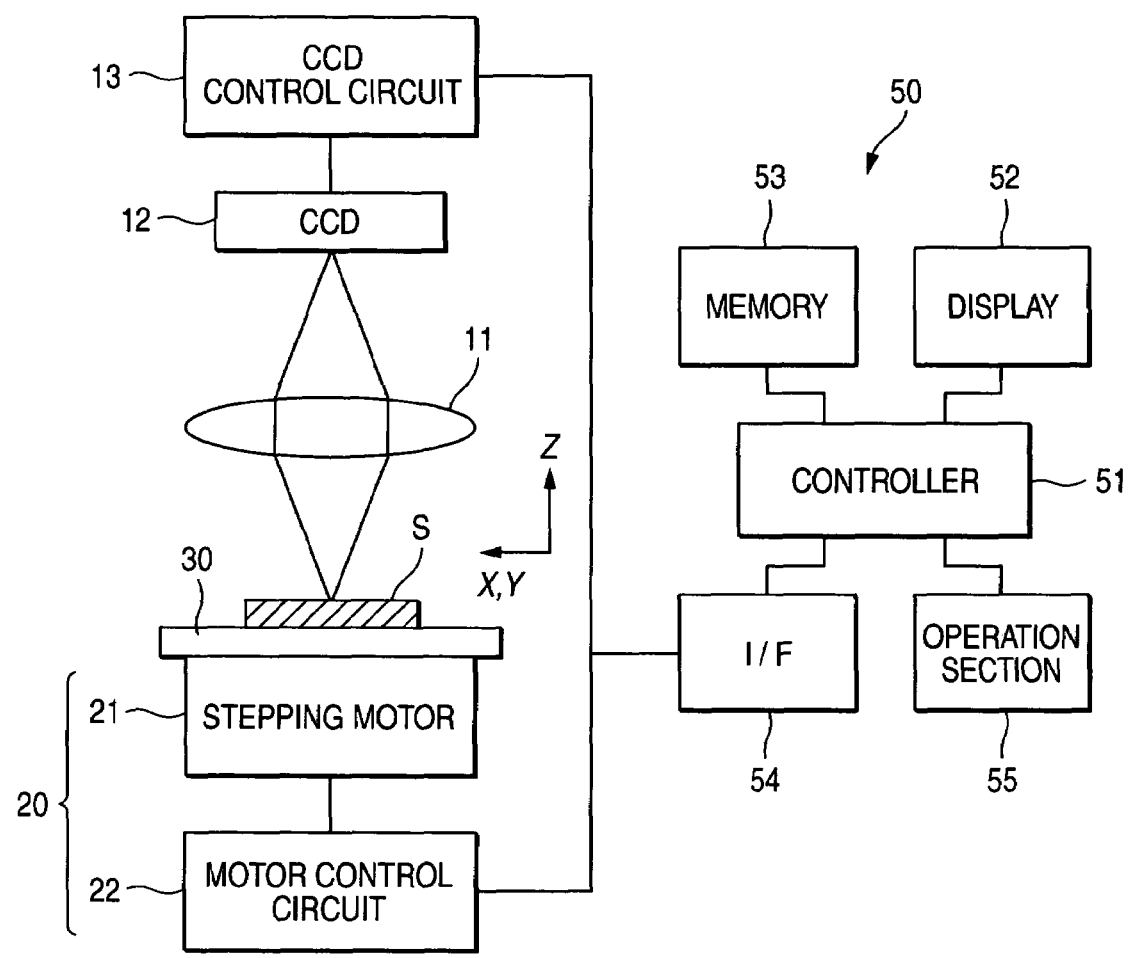
FIG. 2 is a block diagram showing the magnifying observation apparatus according to an embodiment of the invention.

To be more specific, as shown in FIG. 2, the imaging section comprises an observation subject fixing section (stage 30 for mounting the observation subjects) and a light receiving element (CCD12). The light receiving element electrically reads per pixel arranged two-dimensionally a reflected light or a transmitted light from the observation subject fixed to the observation subject fixing section incident via an optical system. Further, an information processor 50 (main unit of the magnifying observation apparatus) is connected to the imaging section. The information processor 50 comprises an image data storage (memory 53), the display 52, an input section (an operation section 55, a pointing device 55a), and a controller 52. The image data storage stores image data read by the light receiving element. The display 52 displays an image based on the image data electrically read by the light receiving element. The input section performs input based on a screen displayed on the display 52. The controller 51 performs processing such as image processing base on the information input with the input section.

FIG. 1 shows an external view of a magnifying observation apparatus according to an embodiment of the invention. A camera 10 comprising an optical system and an image pick-up element is attached to a camera attaching section 43 fixed to a support 42 extending vertically from a stand 41. On the stand 41 is arranged the stage elevator 20 on top of which is attached the stage 30 for placing the observation subject S. The camera 10 and the stage elevator 20 are connected to and controlled by the information processor 50. The information processor 50 comprises the display 52 and the operation section 55 such as a pointing device 55a. An observation image display 52A and a simple observation image, display 52B are alternately or simultaneously displayed on the display 52.

FIG. 2 shows a block diagram of the magnifying observation apparatus according to an embodiment of the invention. The information processor 50 comprises the display 52, the memory 53, an interface 54, and the operation section 55. The memory 53 stores a control program, focal length information, light reception data and two-dimensional information. The information processor 50 communicates with the camera 10 and the stage elevator 20 via the interface 54.

The operator performs operation concerning the magnifying observation apparatus using the operation section 55. The stage elevator 20 comprises, for example, a stepping motor 21 and a motor control circuit 22 for controlling elevation of the stepping motor 21. The camera 10 comprises, for example, a light receiving element such as the CCD 12, a CCD controller circuit 13, and an optical system 11. The CCD controller circuit 13 performs drive control of the CCD 12. The optical system 11 forms on the CCD 12 an image of a reflected light of a light irradiated onto the observation subject S placed on the stage 30 from the illumination section 60.

The information processor 50 inputs control data on the control of the stepping motor 21 into the motor control circuit 22 to vary the relative distance between the stage 30 as an observation subject fixing section and the camera 10 comprising the optical system 11 and the CCD 12 as a light receiving element in the optical axis direction, or height in the z direction in this example. In particular, the information processor 50 inputs control data necessary to control the stage elevator 20 into the motor control circuit 22 to control rotation of the stepping motor 21 and elevates/lowers the height z (position in the z direction) of the stage 30. The stepping motor 21 generates a rotation signal in accordance with the rotation. Based on the rotation signal inputted via the motor control circuit 22, the information processor 50 stores the height z of the stage 30 as information on the relative distance between the observation subject fixing section 30 and the optical system 11 in the optical axis direction. While the relative distance between the observation subject fixing section 30 and the optical system 11 in the optical axis direction is varied by varying the height of the stage 30 in this embodiment, the stage 30 maybe fixed and the height of the optical system 11, for example the height of the camera 10 may be varied.

The CCD 12 can electrically read the quantity of received light per pixel arranged two-dimensionally (x and y directions) The image of the observation subject S formed on the CCD 12 is converted to an electrical signal in each pixel in accordance with the quantity of received light and converted to digital data in the CCD control circuit 13. The information processor 50 stores into the memory 53 the digital data from the CCD control circuit 13 as light receiving data D together with the pixel arrangement information (x, y) as the two-dimensional position information of the observation subject in a plane (x and y directions in FIG. 2) approximately perpendicular to the optical axis direction (z direction in FIG. 2). The plane approximately perpendicular to the optical axis direction need not be a plane strictly at a right angle from the optical axis but may be an observation plane within the range of inclination where the shape of the observation subject can be recognized at the resolution of the optical system and the light receiving element.

While the observation subject is placed on the stage as an example of observation subject fixing section in the foregoing description, an arm may be attached instead of the stage and the observation subject may be fixed to the tip of the arm.

The illumination section 60 shown in FIG. 1 comprises an incident-light illumination 60A for irradiating an incident light and a transmitting illumination 60B for irradiating a transmitted light. These illuminations are connected to the information processor 50 via the optical fiber 61. The information processor 50 comprises a connector 62 for connecting the optical fiber 61 and incorporates a light source (not shown) for transmitting a light to the optical fiber 61 via the connector 62. The light source may be a halogen lamp.

Figure 3A:
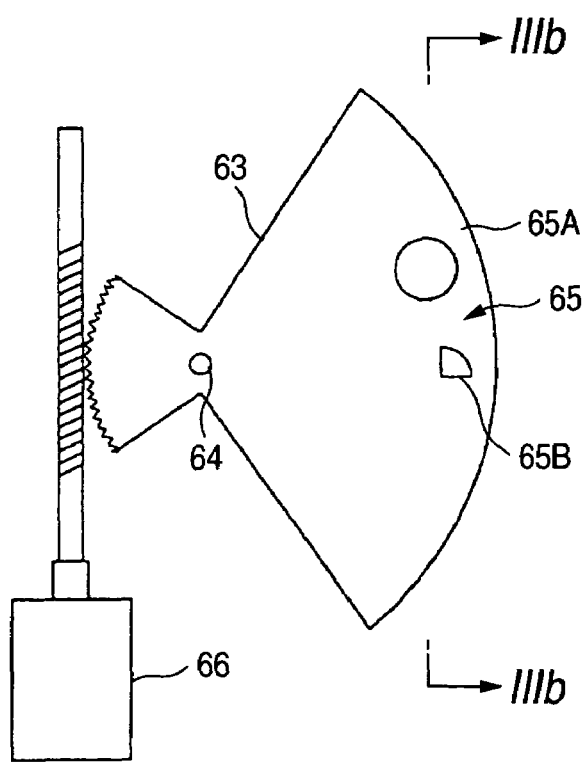
FIGS. 3A and 3B are general views showing a mask plate of the magnifying observation apparatus according to an embodiment of the invention.
Figure 3B:
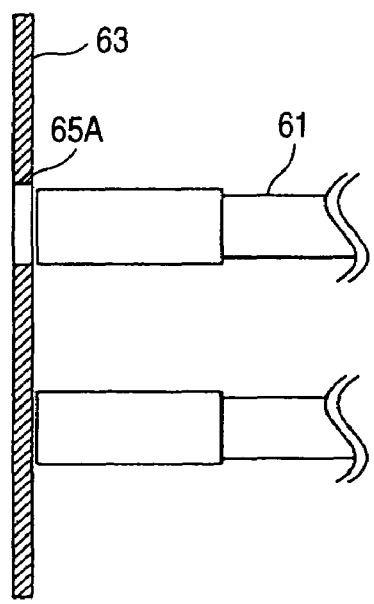

FIGS. 3A and 3B are general views of the terminal of an optical fiber 61 used to couple the optical fiber 61 connected to the illumination section 60 to the information processor 50 and a mask plate 63 for partially masking an illumination light delivered to the illumination section 60 between the terminal and a light source. FIG. 3A shows a plan view of the mask plate 63. FIG. 3B shows a sectional view of the mask plate 63. The mask plate 63 is incorporated in the information processor 50 and arranged between the terminal of the optical fiber 61 connected to the information processor 50 and the light source. As shown in FIG. 3A, the mask plate 63 has a shape of two large and small approximate fans and has a rotary axis 64 at the connection point. The large fan is provided with an opening 65, where are provided an opening 65A of an approximate circular shape for peripheral illumination and an opening 65B of an approximate fan for side illumination. On the small fan, a gear groove is formed in the lateral side of the periphery. The mask plate 63 is rotatably linked about the rotary shaft 64 and is rotated by a motor 66. The motor 66 has a worm gear on its rotary shaft and is arranged so that the gear section of the worm gear engages with the gear groove provided in the arc of the small fan of the mask plate 63. When the motor 66 is started to rotate the mask plate 63, either the opening 65A for peripheral illumination and the opening 65B for side illumination is aligned with one of the terminals of the two optical fibers 61. This connects one of the optical fibers 61 with the light source thus allowing a light to be illuminated from the illumination section 60.

A mechanism to rotate the mask plate 63 is not limited to the warm gear configuration but may be a combination of a pinion gear and a plate gear, a configuration using a cam or crank, or a direct rotation system using a stepping motor or a servo motor.

The opening 65 wholly or partially opens one of the optical fibers 61. When any opening is aligned with one of the optical fibers 61, the other optical fiber 61 is completely blocked by the mask plate 63. As a result, either the incident-light illumination or side illumination is connected to the light source thus causing only either illumination to work exclusively.

FIGS. 4A-4D show the difference between the peripheral illumination and the side illumination. The illumination section 60 has a luminescent section arranged in a ring shape so as to radiate a light in accordance with the section of the optical fiber 61. A light radiated from the ring-shaped luminescent section 60 onto an observation subject converges toward the central axis of the ring as it is radiated as shown in FIGS. 4A-4D.

Figure 4A:
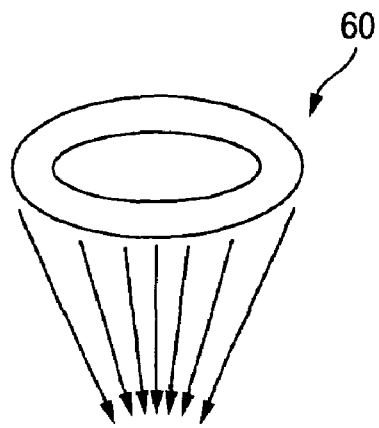
FIGS. 4A-4D are conceptual drawings showing an example of various illumination methods.
Figure 4B:
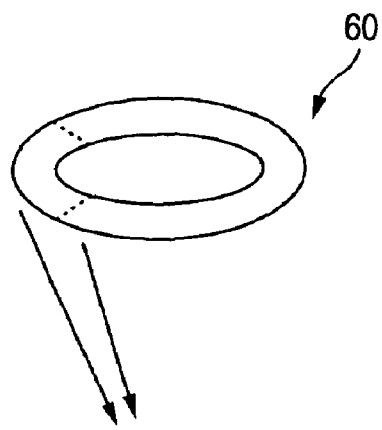

When the opening 65A for peripheral illumination is aligned with the terminal of the optical fiber 61, light is supplied to all the section area of the optical fiber 61. Light is irradiated from all sections of the ring-shaped illumination section 60 as shown in FIG. 4A. As a result, peripheral illumination is provided where light is illuminated onto the observation subject from the periphery. When the opening for side illumination is aligned with the terminal of the optical fiber 61, light is supplied to only part of the section area of the optical fiber 61. The other parts are masked. As a result, side illumination is provided where light is partially irradiated as shown in FIG. 4B. In this example, the central angle of the fan of the opening for side illumination is approximately 90 degrees so that only about one fourth of the entire area of the ring-shaped illumination section 60 emits light thus irradiating only the lateral section.

Figure 4C:
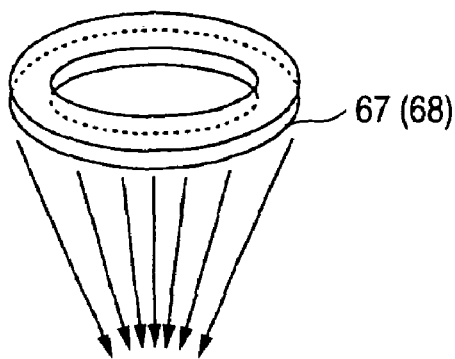
Figure 4D:
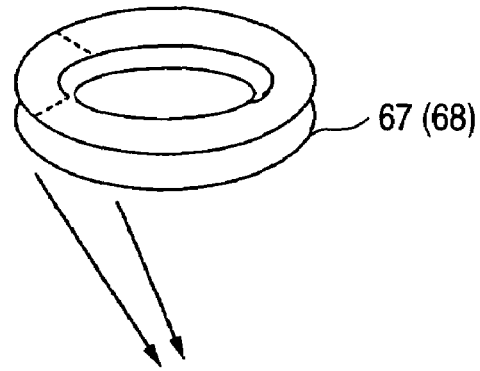

As shown in FIG. 4C, it is possible to use a filter such as a diffuser 67 or a polarizer 68 for peripheral illumination shown in FIG. 4A. The diffuser 67 suppresses the intensity of a light by diffusing the light thus radiating a soft light. The polarizer 68 has an effect of suppressing the glare of a reflected light. When a light is caused to pass through one of theses filters, respective light effect of the filter used is obtained. To insert a filter or change filters, a plurality of filters may be provided on a turret similar to the mask plate and the turret may be rotated to switch between the filters. FIG. 4D shows an example where a filter as the diffuser 67 or the polarizer 68 is used for side illumination shown in FIG. 4B.

In this way, illumination methods applicable to an outgoing light from the ring-shaped illumination of the foregoing embodiment include the incident-light illumination and transmitting illumination. For each of the incident-light illumination and transmitting illumination, peripheral illumination or side illumination is applicable. Further, a diffuser, a polarizer or a transmitted light without using filters may be applied as filtering. A combination of these may be used to vary the illumination method. Setting of these conditions is made on the observation condition setting screen as observation condition setting section.

Figure 5:
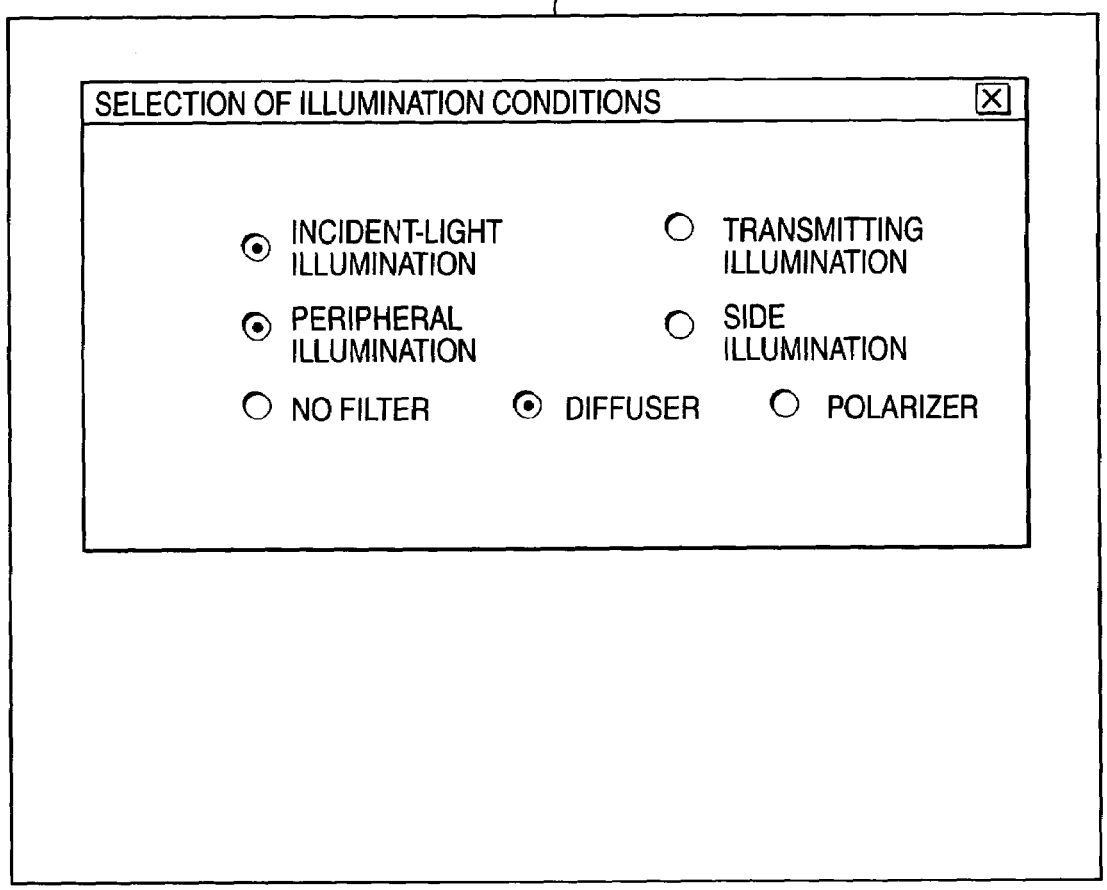
FIG. 5 is an image drawing showing an example of the user interface screen of the illumination condition selection screen in a program for operating the magnifying observation apparatus.

FIG. 5 shows an illumination condition selection screen as an example of an observation condition setting screen. The screen is a user interface screen of a program for operating the magnifying observation apparatus used to operate the operating a magnifying observation apparatus and is displayed in the display 52 of the magnifying observation apparatus. The program for operating the magnifying observation apparatus is incorporated in the information processor 50 as a controller of the magnifying observation apparatus. From the screen, the user operates a pointing device such as a mouse as input section to select radio buttons and specify illumination conditions.

Input Section

The screens shown in FIGS. 5 through 8 and FIG. 10 are setting screens for implementing a simple observation image acquisition function. The procedure to implement the simple observation image acquisition function will be described later with reference to the flowchart in FIG. 11. The input columns as well as the arrangement, shape, representation, size, color and pattern of each button may be varied as required. It is possible to provide an easier-to-see display which allows easy evaluation and judgment and an easy-to-operate layout by way of a change in the design of the screens. For example, a Wizard-based input in each item may be employed so that the user has only to answer questions to make necessary setting. While a detail setting screen is given as a separate window or a detail setting column is provided in the setting window in the following description, either approach may be used or both approaches may be used.

In these user interface screens for the program, ON/OFF of virtual buttons and input columns and specification of a numerical values and instruction input are made on an input section connected to an information processor incorporating the program for the magnifying observation apparatus or a computer where the program is installed. In this specification, the term "press" includes an operation of a button by way of physical contact and a simulated push by way of a click or selection on the input section. An input/output device is connected to the computer by wire or by radio, or fixed to the computer. General input sections include, for example, a mouse or a keyboard, and various pointing devices such as a slide pad, a track point, a tablet, a joystick, a console, a jog dial, a digitizer, a light-pen, a ten-key pad, a touch pad, and an acupoint. These input/output devices may be used to operate hardware such as magnifying observation apparatus as well as operation of a program. Further, a touch screen or touch panel may be used as a display to provide an interface screen so that the user can directly touch the screen with his/her hand for input or operation. Alternately, voice input or any other existing input means or a combination of these may be used.

A computer 70 may be connected to the magnifying observation apparatus. By separately installing a program for operating the magnifying observation apparatus the magnifying observation apparatus may be operated remotely from the computer 70. In the specification, the program for operating the magnifying observation apparatus using a computer includes an operation program installed in a general-purpose or dedicated computer externally connected to the magnifying observation apparatus and an operation program incorporated into the information processor 50 as a controller of the magnifying observation apparatus. In the magnifying observation apparatus, an operation function or operation program to operate the magnifying observation apparatus is previously incorporated. The operation program may be installed into the magnifying observation apparatus in the form of rewritable software or firmware or may be updated as required. Thus, in the specification, a computer to execute a program for operating the magnifying observation apparatus includes the magnifying observation apparatus itself.

Illumination Conditions

Figure 6:
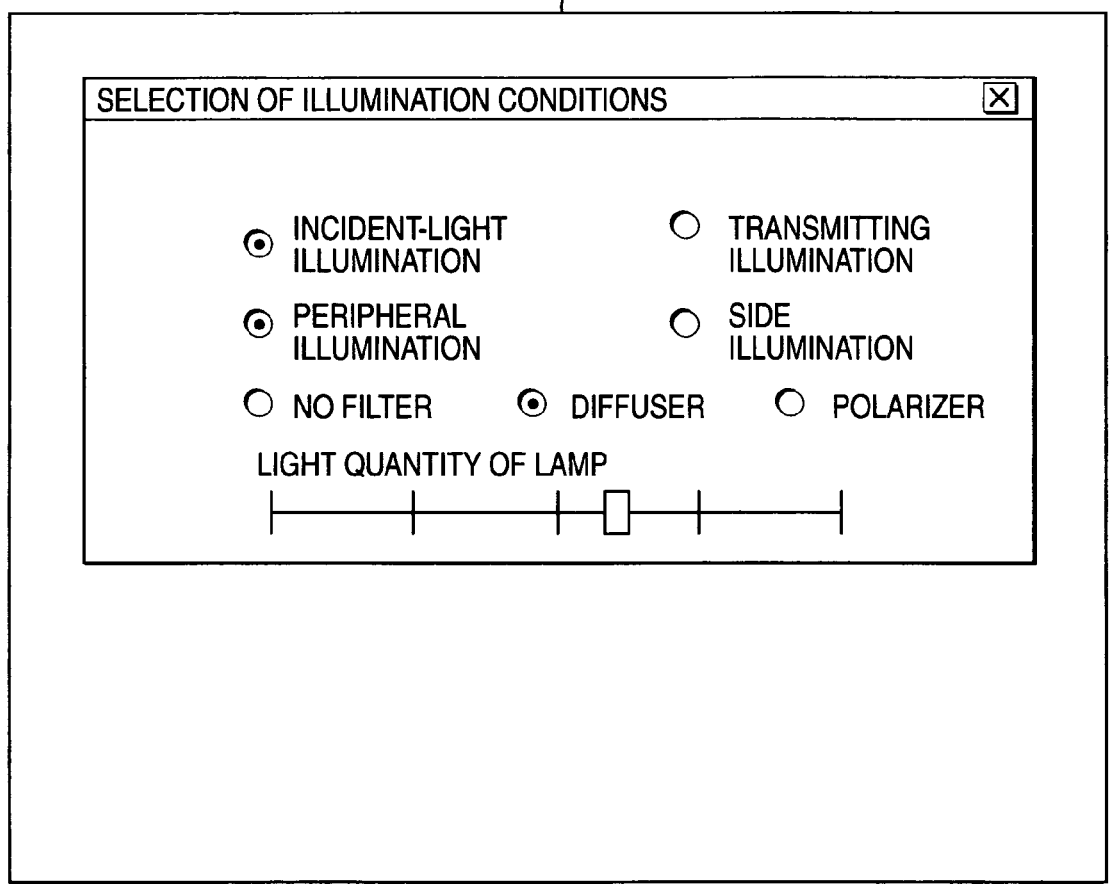
FIG. 6 is an image drawing showing another example of the user interface screen of the illumination condition selection screen in a program for operating the magnifying observation apparatus.
Figure 7:
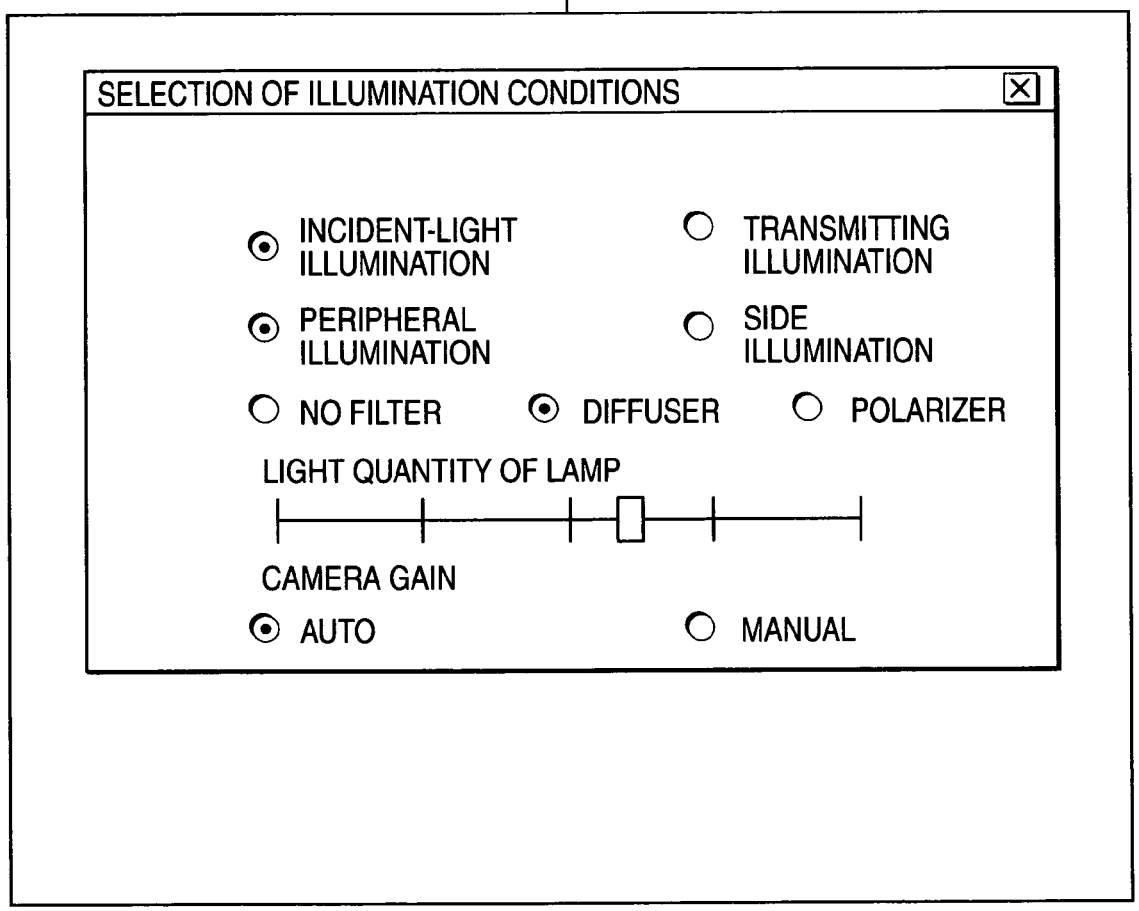
FIG. 7 is an image drawing showing another example of the user interface screen of the illumination condition selection screen in a program for operating the magnifying observation apparatus.
Figure 8:
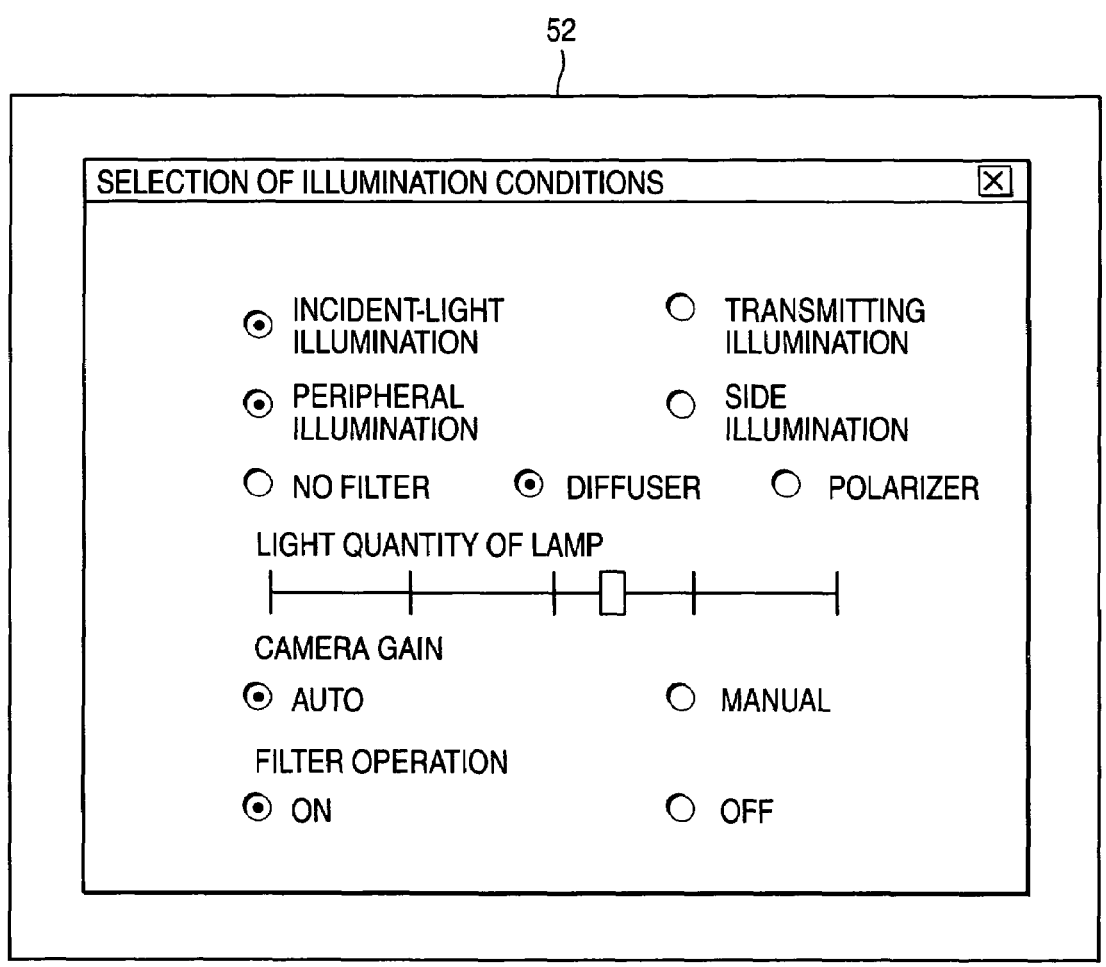
FIG. 8 is an image drawing showing another example of the user interface screen of the illumination condition selection screen in a program for operating the magnifying observation apparatus.

Observation conditions of the magnifying observation apparatus greatly depend on the illumination conditions. The illumination conditions are set with the observation condition setting screen in FIG. 5. The illumination conditions include control of the light quantity of a lamp as a light source as shown in FIG. 6. The light quantity is controlled by moving a slider sideways. A camera gain may be controlled as shown in FIG. 7. Image processing such as filter operation may be made on an observation image acquired as shown in FIG. 8. In these examples, automatic setting (Auto) or manual setting (Manual) is specified as a camera gain and ON or OFF of filter operation is selected.

Figure 9:
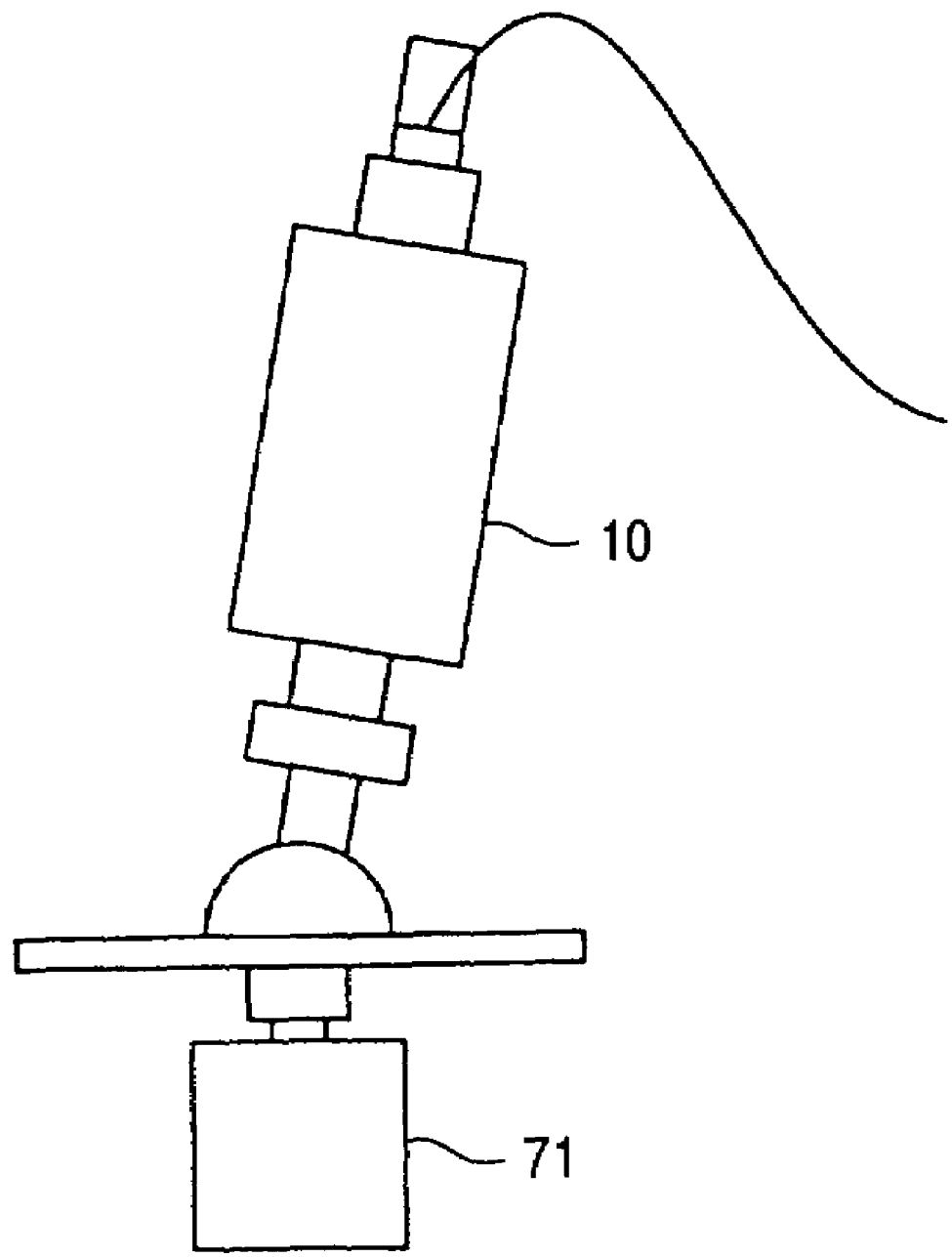
FIG. 9 is a general view showing an actuator for adjusting the angle of a camera.

As well as by setting the illumination conditions, photographing is also allowed by changing the angle of a camera 10 as imaging section. As shown in FIG. 9, it is possible to use an actuator 71 to make adjustable the orientation or angle of the camera 10, thereby grasping the observation subject at another angle.

In this way, according to the embodiment of the invention, parameters for imaging an observation subject include various factors such as illumination conditions and angle of a camera. The user adjusts these factors to acquire a desired image. The control is made manually by the user although a beginner does not know which parameters are to be adjusted to acquire which image or which parameters are to be adjusted to obtain a desired image. Some skill and knowledge are required for the control which is no easy task. Thus, the magnifying observation apparatus according to this embodiment is equipped with a simple observation image acquisition function for setting various observation conditions and automatically and simply acquiring a plurality of images for user's selection. The simple observation image acquisition function automatically sets a plurality of observation conditions with parameters adjusted in various ways, acquires a magnified image simply or preliminarily under respective conditions, and lists a plurality of observation results for user's selection of a desired image.

Figure 10A:
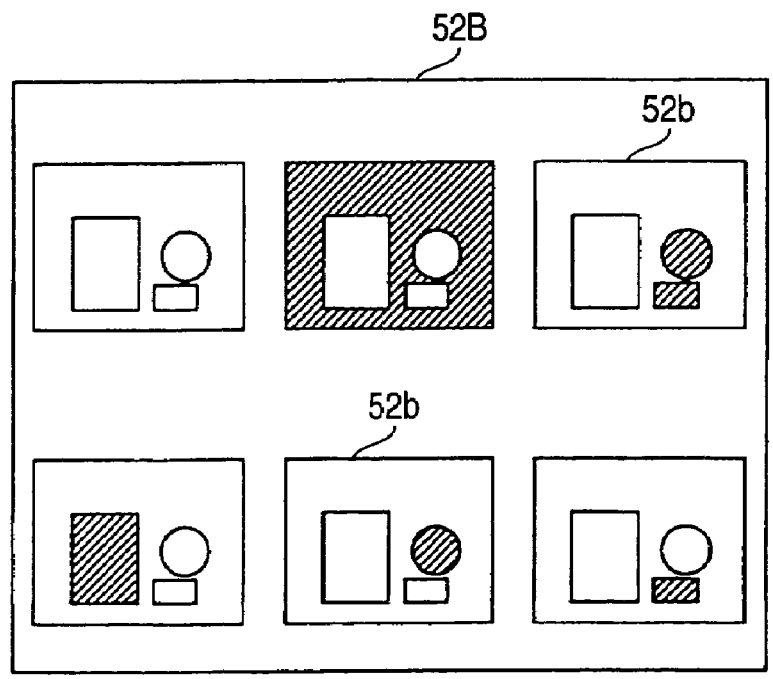
FIGS. 10A and 10B are image drawings showing an example of the simple observation image display.
Figure 10B:
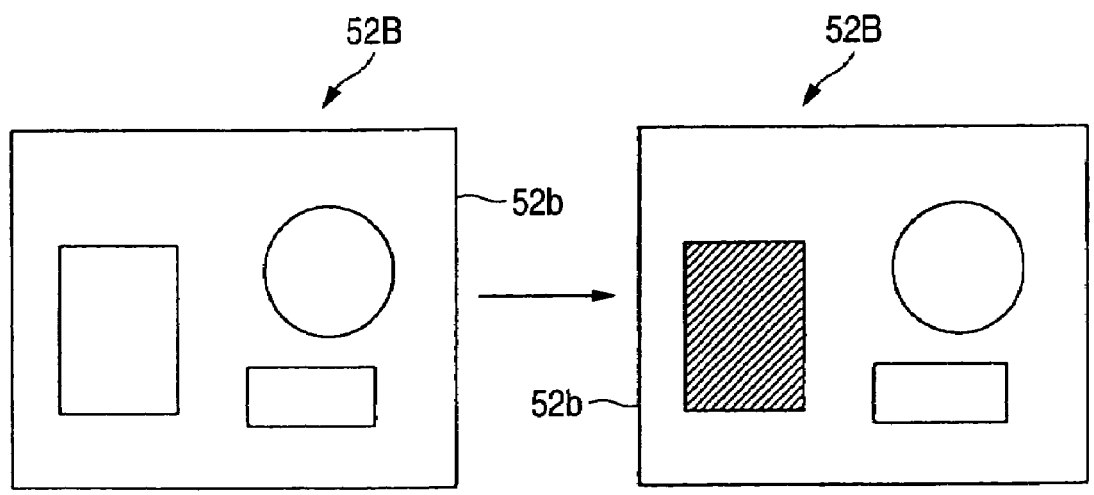

FIG. 10 shows an example of a simple observation image display 52B for displaying the results of execution of the simple observation image acquisition function. FIG. 10A shows a method for listing the simple observation images 52b acquired. FIG. 10B shows a method for selectively displaying each of the simple observation images 52b. In either method, it is possible to display the simple observation image display 52B side by side with an observation image display 52A as a main screen for displaying observation images 52a acquired. Alternatively, the observation image display 52A and the simple observation image display 52B may be given in separate windows.

In FIG. 10A, simple observation images 52b are displayed smaller than regular observation images 52a to list a plurality of images. While not shown, simple observed thumbnail images 52b may be arranged in a list display and a selected image may be magnified in a preview display column. By displaying small the simple observation images 52b, it is possible to list a plurality of simple observation images 52b, thus allowing easy comparison between the images. While six simple observation images 52b are acquired in the example of FIG. 10A, the number of images is not limited to six but may be less than six, for example four, or more than six, for example more than seven. To display a larger number of simple observation images 52b, a large-capacity image memory to temporarily store images or a large video memory for screen display must be provided.

As shown in FIG. 10B, the simple observation images 52b may be displayed selectively one at a time. Selection may use a mouse click or toggling through button operation, or a slide show may be employed where display is switched automatically at predetermined periods. By displaying each image, it is possible to display each simple observation image 52b larger, approximately the same size as a regular observation image 52a, thereby allowing minute observation. Listing in FIG. 10A and individual display in FIG. 10B may be alternately selected as desired by the user.

In this way, by displaying acquired images in various methods, it is possible to select an image closest to the desired image while comparing the images with each other. By using this function, the user need not know the setting items and parameters of the observation conditions. The user has only to compare the actual images with each other and visually select a desired image to know the appropriate observation conditions from the simple observation conditions set to the selected simple observation image. The observation conditions may be further adjusted as required to acquire an observation image a new. This allows a beginner to readily acquire a desired image.

Figure 11:
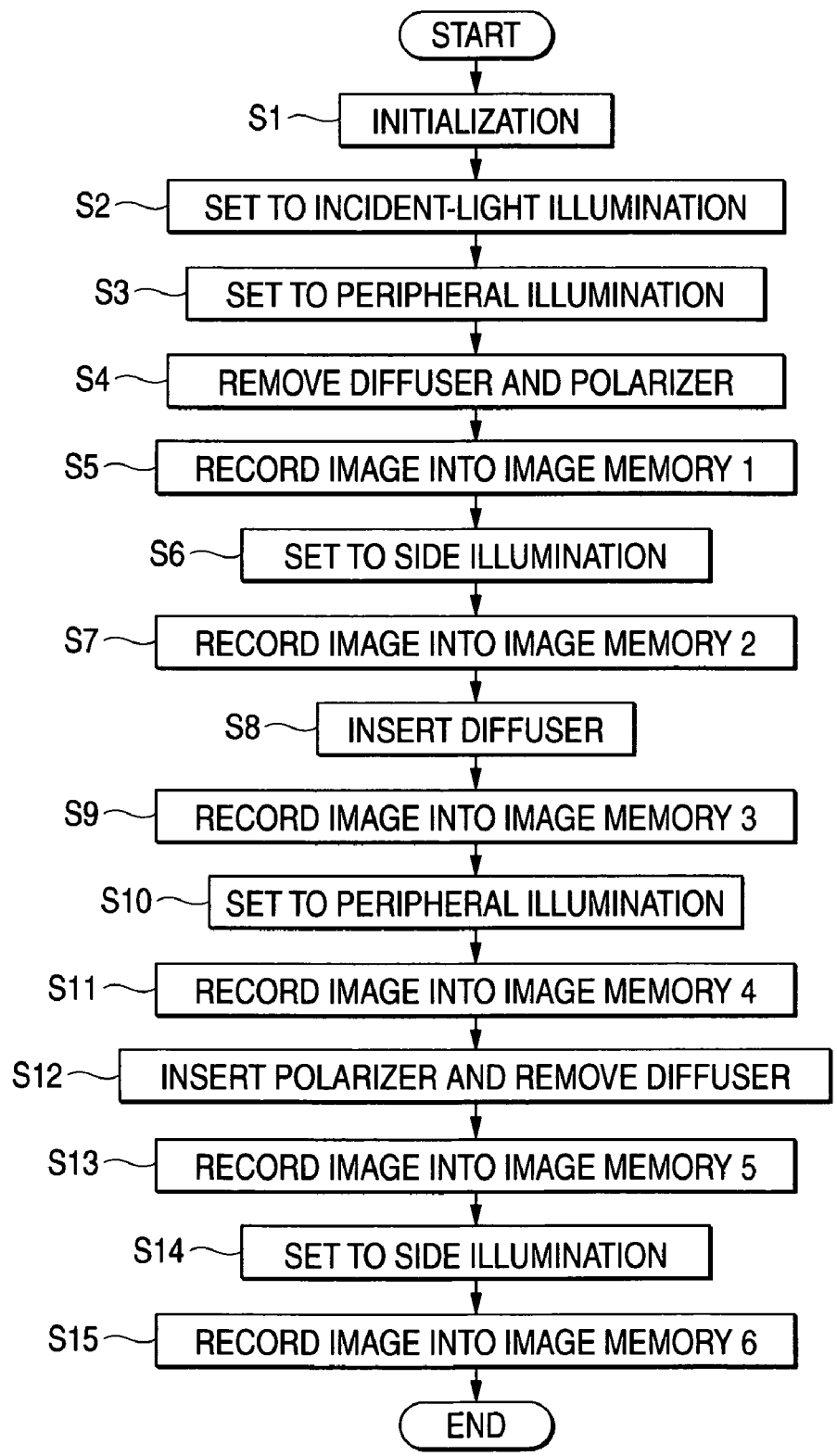
FIG. 11 is a flowchart showing a procedure to acquire a simple observation image by way of a simple observation image acquisition function.

Next, a procedure to vary the observation conditions by way of the simple observation image acquisition function to acquire a plurality of simple observation images will be described based on the flowchart in FIG. 11. In the example of FIG. 11, six simple observation images 1 through 6 are acquired and respectively stored into image memories 1 through 6. The image memory is an embodiment of simple observation image storage section and can use the image data storage. A plurality or image memories may be provided in the image data storage or the storage area may be split into a plurality of subsections.

Simple observation conditions for acquiring each simple observation image are combinations of observation conditions selectable on the illumination condition selection screen in FIG. 5. The simple observation conditions maybe automatically set with the magnifying observation apparatus or arbitrarily specified by the user.

In step S1, the image memory and illumination are initialized. At this point in time, the light source is not connected to the optical fiber and filters such as a diffuser 67 are all inserted. At this point in time, the user must have finished positioning and focusing on the observation subject on the observation image display 52A.

Next, in steps S2 through S5, a simple observation image 1 to be recorded into an image memory 1 is acquired. In step S2, incident-light illumination is set. In step S3, a mask plate 63 is rotated to align the opening for peripheral illumination with the terminal of an optical fiber 61 for incident-light illumination. Then, in step S4, the diffuser 67 and the polarizer 68 are removed from the ring-shaped illumination so as to provide a transmitted light. In step S5, the simple observation image 1 is acquired under the aforementioned simple observation conditions, or more precisely, incident-light illumination, peripheral illumination and transmitted light, and is recorded into the image memory 1.

Next, a simple observation image 2 is acquired. The mask plate 63 is rotated so as to switch from the simple observation conditions set in steps 1 through 4, that is, incident-light illumination, peripheral illumination and transmitted light, to side illumination in step S6. Under the simple observation conditions, or incident-light illumination, side illumination and transmitted light, the simple observation image 2 is acquired and recorded into an image memory 2 in step S7.

The simple observation conditions are varied the same way to sequentially acquire simple observation images 3 through 6 in the subsequent steps. In step S8, the diffuser 67 is inserted and the simple observation conditions including incident-light illumination, side illumination and diffuser 67 are set. Under these conditions, a simple observation image 3 is acquired. The simple observation image 3 is recorded into an image memory 3 in step S9. In step S10, the mask plate 63 is rotated to provide peripheral illumination. The simple observation conditions are set to incident-light illumination, peripheral illumination and diffuser 67. Under these conditions, a simple observation image 4 is acquired. The simple observation image 4 is recorded into an image memory 4 in step S11. In step S12, a polarizer 68 is inserted and the diffuser 67 is removed and the simple observation conditions including incident-light illumination, peripheral illumination and polarizer 68 are set. Under these conditions, a simple observation image 5 is acquired. The simple observation image 5 is then recorded into an image memory in step S13. Finally in step S14, the mask plate 63 is rotated to provide side illumination. The simple observation conditions are set to incident-light illumination, side illumination and polarizer 68. Under these conditions, a simple observation image 6 is acquired. The simple observation image 6 is recorded into an image memory 6 in step S15.

The simple observation images 1 through 6 acquired in this way are displayed on the simple observation image display 52B as shown in FIG. 10. As shown in the figure, only the simple observation images may be displayed or respective simple observation conditions may be displayed in text information. For example, an information display column may be provided as part of the screen to display the information on the simple observation conditions for the selected simple observation image. Or, with the simple observation images shown in FIG. 10A listed, placing a mouse cursor on each simple observation image may display the simple observation conditions used when the simple observation image was acquired by way of tool tip display or balloon display.

While the simple observation conditions for electrically reading a reflected light from the observation subject fixed to the observation subject fixing section by way of incident-light illumination in the aforementioned embodiments, it is also possible to use simple observation conditions for electrically reading a transmitted light obtained by irradiating a light from behind an observation subject by using transmitting illumination. Similarly, it is also possible to add parameters to control the brightness of illumination as shown in FIG. 6, parameters to select Auto/Manual of a camera gain as shown in FIG. 7, and parameters to switch ON/OFF the filter operation as shown in FIG. 8. Further, it is also possible to add parameters to adjust the angle of the camera as shown in FIG. 9. Moreover, it is possible to specify the type of an observation subject to set corresponding adequate observation conditions.

Control of Brightness of Illumination

Control of brightness of illumination is enabled by controlling a dimmer circuit by way of an information processor 50 or a computer 70. Means for controlling the brightness of an image include adjustment of the camera shutter speed, gain control, and control of the light quantity of a lamp. To observe a work vulnerable to halation, a lower light quantity of a lamp may lead to a better image.

In case the brightness of an image is not completely controlled by way of control of the light quantity of a lamp and adjustment of the camera shutter speed, the camera gain is set to a higher value to make the image lighter. In ordinary observation, the brightness of an image is controlled by adjusting the camera shutter speed. To obtain an optimum color representation by way of observation subject and observation conditions, control of white balance is also necessary.

Filter Operation

Filter operation is executed on an image according to the conditions of a target image. For example, edge emphasis filter operation is made in order to sharpen the image.

Camera Angle

As shown in FIG. 9, it is possible to change the angle of a camera head by controlling an actuator 71 and photograph the observation subject at another angle. Through imaging at another camera angle, it is possible to obtain an image with different illumination.

Type of Observation Object

It is possible to previously set appropriate observation conditions or simple observation conditions depending on the type of observation subject and call the optimum observation conditions by the user's selection of an observation subject. For example, observation of a metal is more vulnerable to halation. Through composite operation using two images shot at different shutter speed, it is possible to suppress halation. The composite operation is a process whereby an image subject to halation is replaced with an image free from halation. Imaging at a higher shutter speed results in reduced halation. A combination of a plurality of pictures taken at different shutter speeds can produce an image without halation. Brightness of each image preferably undergoes preprocessing so as to make the seam inconspicuous, since the seam between two images without preprocessing will result in the conspicuous seam.

In case the observation subject is a living thing, edge emphasis filtering is made. In case a mineral is observed, photographing in the monochrome mode is preferable. Further, the polarizer 68 is inserted before observation.

As mentioned hereabove, a magnifying observation apparatus, a method for operating the magnifying observation apparatus, and a computer-readable medium storing instructions for operating the magnifying observation apparatus, according to the invention, provide an easy-to-use operation environment where the user can readily acquire a desired image without expert knowledge on the magnifying observation apparatus. This is because the magnifying observation apparatus, the method for operating the magnifying observation apparatus, and the computer-readable medium storing instructions for operating the magnifying observation apparatus, according to the invention automatically acquire a plurality of images under a plurality of observation conditions in a simple fashion to allow selection of a desired image by the user and observation under the selected conditions. In general, setting of observation conditions is not easy for a beginner. With this invention, a plurality of simple observation images are listed to allow selection of a desired image by the user. This lets the user visually select the target image so that it is easy to select appropriate setting conditions and a beginner not familiar with the operation of magnifying observation apparatus can advantageously use the magnifying observation apparatus of the invention intuitively.

What is claimed is:

1. A magnifying observation apparatus comprising:
   a photographing section for photographing an observation image from an observation subject;
   an illuminating section for illuminating the observation subject;
   an illuminating direction switching section for switching the illumination direction of said illuminating section;
   a first observation condition setting section for setting a plurality of first observation conditions, each of the plurality of first observation conditions including a distinct pre-selected illuminating direction with respect to the observation subject;
   a first observation image display section for displaying a plurality of first observation images of the observation subject photographed with said photographing section, each of the plurality of first observation images being acquired per a different one of the plurality of first observation conditions including a respective distinct illumination direction set with said first observation condition setting section, simultaneously on the same display screen of said display section;
   a selection section for selecting one desired first observation image from among the plurality of first observation images displayed on said first observation image display section;
   a second observation condition setting enabling to set further observation conditions based on the first observation condition set to the first observation image selected with said selection section; and
   a second observation image display section for displaying a second observation image acquired based on the observation condition set with said second observation condition setting section.

2. The magnifying observation apparatus according to claim 1, further comprising:
   a first observation image acquisition section for acquiring first observation images per said plurality of first observation conditions set with said first observation condition setting section;
   a first observation image storage section for storing a plurality of first observation images acquired with said first observation image acquisition section; and
   a second observation image acquisition section for acquiring a second observation image based on the observation conditions set with said second observation condition setting section,
   wherein said first observation image display section displays the plurality of first observation images stored into said first observation image display section, and said second observation image display section displays the second observation image acquired with said second observation image acquisition section.

3. The magnifying observation apparatus according to claim 1, wherein said first observation image display section lists a plurality of first observation images.

4. The magnifying observation apparatus according to claim 1, wherein said first observation image display section comprises a switching section for selectively displaying the plurality of first observation images.

5. The magnifying observation apparatus according to claim 1, further comprising:
   an adjustment section for performing at least positioning and focusing on a second observation image displayed on said second observation image display section before setting first observation conditions by said first observation condition setting section.

6. The magnifying observation apparatus according to claim 1, wherein the first observation conditions set with said first observation condition setting section includes at least one of the control of brightness of an image, adjustment of illumination method, adjustment of an angle of an imaging section, and image processing.

7. The magnifying observation apparatus according to claim 1, wherein the first observation conditions set with said first observation condition setting section includes an adjustment of illumination method and wherein the adjustment of the illumination method is made by way of at least one of selection between incident-light illumination and transmitting illumination as an illumination direction, selection between peripheral illumination and side illumination, and selection among a diffuser, a polarizer and a transmitted light without using filters as a filter for an illumination light.

8. The magnifying observation apparatus according to claim 1, wherein the first observation conditions set with said first observation condition setting section includes a control of brightness of an image, wherein the control of the brightness of an image is done by at least one of the control of the light quantity of the illumination, adjustment of the shutter speed of the imaging sections, gain control, and control of white balance.

9. The magnifying observation apparatus according to claim 1, wherein at least the characteristics of an observation subject is set with said first observation condition setting section.

10. The magnifying observation apparatus according to claim 1, wherein the illumination section comprises illuminating parts, and wherein the first observation conditions comprise the condition that all parts of the illumination parts are illuminated and/or the condition that one part of the illuminating parts is illuminated.

11. The magnifying observation apparatus according to claim 1, wherein the illumination section comprises illuminating parts, and wherein the illumination section and the illuminating direction switching section comprises the condition that all parts of the illumination parts are illuminated and/or the condition that one part of the illuminating parts is illuminated.

12. The magnifying observation apparatus according to claim 1, wherein the illumination section comprises a ring-shaped illuminating part.

13. The magnifying observation apparatus according to claim 1, further comprising photographing adjustment means for photographing the observation subject under illumination conditions from respectively different angles by controlling the illuminating direction switching section of said illumination section per the illuminating conditions set to said first observation condition setting section.

14. The magnifying observation apparatus according to claim 1, wherein the first observation conditions of the first observation condition setting section are set automatically.

15. The magnifying observation apparatus according to claim 1, wherein the first observation conditions of the first observation condition setting section are set arbitrarily.

16. The magnifying observation apparatus according to claim 1, wherein the first observation conditions comprise the condition of an incident light illumination and the condition of a transmitting illumination.

17. The magnifying observation apparatus according to claim 1, wherein the first observation conditions comprise die condition of a filter being present or absent, and wherein the filter is preferably a polarizer or a diffuser.

18. The magnifying observation apparatus according to claim 1, wherein the observation image display section is identical with the first observation image display section.

19. The magnifying observation apparatus according to claim 1, wherein a menu for setting the first observation condition is displayed on the display screen.

20. The magnifying observation apparatus according to claim 1, further comprising display means for displaying an observation image based on a signal acquired by said photographing means.

21. A method for operating a magnifying observation apparatus, said method comprising:
  photographing an observation image with arbitrary observation conditions and displaying an arbitrary observation image photographed;
  performing at least positioning and focusing on the arbitrary observation image displayed;
  varying the observation conditions on the adjusted observation image and setting first observation conditions for acquiring a plurality of observation images of the observation image, each of the first observation conditions including a distinct pre-selected illuminating direction;
  acquiring first observation images of the observation image per said plurality of first observation conditions set, each of the first observation images being acquired per a different one of the plurality of first observation conditions including a respective distinct illumination direction;
  displaying the plurality of first observation images of the observation image acquired simultaneously;
  selecting a desired first observation image from among the plurality of first observation images displayed;
  setting further observation conditions as required based on the first observation conditions set to the first observation image selected;
  acquiring a second observation image based on the observation conditions set; and displaying the acquired second observation image.

22. The method according to claim 21, wherein varying the observation conditions comprises varying the illumination conditions of the observation subject.

23. The method according to claim 22, wherein the illumination conditions comprise a plurality of different angles of illumination of the observation subject and/or the condition that all parts of the illumination parts are illuminated and/or the condition that one part of the illuminating parts is illuminated and/or the condition of an incident light illumination and/or the condition of a transmitting illumination and/or the condition of a filter being present or absent, wherein the filter is preferably a polarizer or a diffuser.

24. The method according to claim 21, further comprising switching the illuminating direction of illumination means.

25. A computer-readable medium storing instructions for operating a magnifying observation apparatus, said instructions comprising:
  photographing an observation image with arbitrary observation conditions and displaying an arbitrary observation image photographed;
  performing at least positioning and focusing on the arbitrary observation image displayed;
  varying the observation conditions on the adjusted observation image and setting first observation conditions for acquiring a plurality of observation images of the observation image, each of the first observation conditions including a distinct pre-selected illuminating direction;
  acquiring first observation images of the observation image per said plurality of first observation conditions set, each of the first observation images being acquired per a different one of the plurality of first observation conditions including a respective distinct illumination direction;
  displaying the plurality of first observation images of the observation image acquired;
  selecting a desired first observation image from among the plurality of first observation images displayed;
  setting further observation conditions as required based on the first observation conditions set to the first observation image selected;
  acquiring a second observation image based on the observation conditions set; and
  displaying a second observation image acquired.

* * * * *